(12) United States Patent
Lee et al.

(10) Patent No.: US 9,746,546 B2
(45) Date of Patent: Aug. 29, 2017

(54) METHOD AND DEVICE FOR SENSING SURROUNDING ENVIRONMENT BASED ON FREQUENCY MODULATED CONTINUOUS WAVE RADAR

(71) Applicant: MANDO CORPORATION, Pyeongtaek-si, Gyeonggi-do (KR)

(72) Inventors: Jae Eun Lee, Seoul (KR); Hae Seung Lim, Yongin-si (KR); Seong Hee Jeong, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 495 days.

(21) Appl. No.: 14/316,933

(22) Filed: Jun. 27, 2014

(65) Prior Publication Data
US 2015/0323649 A1    Nov. 12, 2015

(30) Foreign Application Priority Data

Dec. 2, 2013  (KR) .................... 10-2013-0148215

(51) Int. Cl.
| | |
|---|---|
| G01S 13/93 | (2006.01) |
| G01S 7/35 | (2006.01) |
| G01S 13/04 | (2006.01) |
| G01S 13/34 | (2006.01) |
| G01S 13/58 | (2006.01) |
| G01S 13/72 | (2006.01) |

(52) U.S. Cl.
CPC .............. *G01S 7/354* (2013.01); *G01S 13/04* (2013.01); *G01S 13/345* (2013.01);
(Continued)

(58) Field of Classification Search
CPC ...... G01S 7/292; G01S 7/2922; G01S 7/2927; G01S 7/414; G01S 13/50; G01S 13/5244;
(Continued)

(56) References Cited

U.S. PATENT DOCUMENTS

| | | | | | |
|---|---|---|---|---|---|
| 4,749,994 A | * | 6/1988 | Taylor, Jr. | ............. | G01S 7/2927 342/195 |
| 5,254,999 A | * | 10/1993 | Lee | ........................ | G01S 7/2923 342/185 |
| 5,793,326 A | * | 8/1998 | Hofele | .................. | G01S 7/2927 342/159 |

(Continued)

FOREIGN PATENT DOCUMENTS

| | | |
|---|---|---|
| CN | 101271158 B | 12/2012 |
| CN | 102819018 A | 12/2012 |

OTHER PUBLICATIONS

Chinese Office Action dated Oct. 10, 2016 in connection with the counterpart Chinese Patent Application No. 201410303017.4.

*Primary Examiner* — Peter Bythrow
*Assistant Examiner* — Nuzhat Pervin
(74) *Attorney, Agent, or Firm* — Hauptman Ham, LLP

(57) ABSTRACT

Disclosed herein are a method and device for sensing a surrounding environment based on a frequency modulated continuous wave (FMCW) radar. The method for detecting a target based on an FMCW radar includes the steps of: the FMCW radar transmitting a sensing signal for detection of the target, and receiving a response signal in response to the sensing signal; the FMCW radar performing a signal processing on the response signal, and generating a frequency spectrum of a beat signal; the FMCW radar determining a detection frequency band for detection of the target within a valid frequency band of the frequency spectrum; the FMCW radar determining a threshold value to determine a target detection peak value for detection of the target among peak values of the frequency spectrum; and the FMCW radar detecting the target based on the detection frequency band and the threshold value.

10 Claims, 9 Drawing Sheets

(52) U.S. Cl.
CPC .......... *G01S 13/584* (2013.01); *G01S 13/726* (2013.01); *G01S 13/931* (2013.01); *G01S 2007/356* (2013.01)

(58) Field of Classification Search
CPC ........ G01S 7/354; G01S 13/04; G01S 13/345; G01S 13/584; G01S 13/726; G01S 13/931; G01S 2007/356
USPC .......................................... 342/27, 159, 122
See application file for complete search history.

(56) References Cited

U.S. PATENT DOCUMENTS

| | | | | |
|---|---|---|---|---|
| 6,833,808 | B2* | 12/2004 | Rees | ..................... G01S 13/534 |
| | | | | 342/159 |
| 6,888,494 | B2* | 5/2005 | Tamatsu | ................ G01S 13/345 |
| | | | | 342/109 |
| 7,339,518 | B2* | 3/2008 | Natsume | ................... G01S 7/36 |
| | | | | 342/109 |
| 8,013,781 | B2* | 9/2011 | Stockmann | ........... G01S 7/2923 |
| | | | | 342/159 |
| 8,085,184 | B2* | 12/2011 | Takabayashi | ......... G01S 13/343 |
| | | | | 342/104 |
| 9,110,152 | B2* | 8/2015 | Ando | ...................... G01S 7/352 |
| 9,157,992 | B2* | 10/2015 | Wang | ................. G01S 13/0218 |
| 9,274,211 | B2* | 3/2016 | Maeno | .................. G01S 7/2927 |
| 9,429,649 | B2* | 8/2016 | Kawabe | .................. G01S 7/354 |
| 2009/0096661 | A1* | 4/2009 | Sakamoto | .............. G01S 7/021 |
| | | | | 342/92 |
| 2014/0176361 | A1* | 6/2014 | Dizaji | .................. G01S 7/2922 |
| | | | | 342/93 |

\* cited by examiner

METHOD AND DEVICE FOR SENSING SURROUNDING ENVIRONMENT BASED ON FREQUENCY MODULATED CONTINUOUS WAVE RADAR

CROSS-REFERENCE TO RELATED APPLICATION(S)

This application claims priority to Korean Patent Application No. 10-2013-0148215, filed on Dec. 2, 2013, the disclosure of which is incorporated herein by reference in its entirety.

BACKGROUND OF THE INVENTION

Field of the Invention

Exemplary embodiments of the present invention relate to a method for sensing a surrounding environment, and more particularly, to a method and device for sensing a surrounding environment based on a frequency modulated continuous wave (FMCW) radar.

Description of the Related Art

ITU-R recommends various items related to Transport Information and Control Systems (TICS). The Transport Information and Control Systems are systems in which computer, communication, positioning information and vehicle technologies are integrated in order to improve the safety, the efficiency and the management method of terrestrial traffic systems.

Of the TICS, the Advanced Vehicle Control Systems (AVCS) directly related to travel of a vehicle include several items required for preventing a collision, wherein a radar for a vehicle is one of technologies which can be applied for safe travel of the vehicle through assistance for the driver.

A radar using a laser beam had been commercialized as a radar for a vehicle in Japan in the early 1980's. However, since the laser beam is so susceptible to various weather conditions or the like, a method using a millimeter wave has nowadays been widely spread. Since a radar for a vehicle using a millimeter wave causes relatively less errors even in various weather conditions on the characteristics of application, and has a feature wherein usage is easy, a radar for a vehicle using a millimeter wave is one of fields for which research is being the most actively conducted. Research for the method is started from the early 1970's, and various products are nowadays mounted on vehicles and operate. Application technologies of vehicle radars are called an active cruise control, an adaptive cruise control, an intelligent cruise control, or the like, representative companies applying the technologies to vehicles include Daimler-Benz, BMW, Jaguar, and Nissan. Especially, the fact that application instances as described above perform a direct vehicle control over a simple alarm using a radar may be regarded as a remarkable technical advance.

In Korea, according to the regulation of Radio Law Article 9, frequencies for vehicle radars are classified and distributed into specific small-output wireless stations in connection with an intelligent traffic system on April 2001. Herein, a frequency band of 76 GHz-77 GHz having a bandwidth of 1 GHz is employed, and the use thereof is stipulated for collision prevention of vehicles or the like.

SUMMARY OF THE INVENTION

A first object of the present invention is to provide a method for sensing a surrounding environment based on an FMCW radar.

A second object of the present invention is to provide a device which performs the method for sensing a surrounding environment based on an FMCW radar.

In accordance with one aspect of the present invention to solve the first object of the present invention, a method for detecting a target based on a frequency modulated continuous wave (FMCW) radar may include the steps of: the FMCW radar transmitting a sensing signal for detection of the target, and receiving a response signal in response to the sensing signal; the FMCW radar performing a signal processing on the response signal, and generating a frequency spectrum of a beat signal; the FMCW radar determining a detection frequency band for detection of the target within a valid frequency band of the frequency spectrum; the FMCW radar determining a threshold value to determine a target detection peak value for detection of the target among peak values of the frequency spectrum; and the FMCW radar detecting the target based on the detection frequency band and the threshold value. The detection frequency band may correspond to a frequency band obtained by excluding a frequency band corresponding to frequencies after a frequency of a largest peak value among the target detection peak values, from the valid frequency band, with respect to the largest peak value. The threshold value may be determined based on a clutter signal included in the response signal, and the clutter signal may be the response signal generated by an object which is not the target. The threshold value may be determined based on a reference frequency spectrum of a beat signal sensed in a reference cell, and the reference cell may be a detection area in which a target does not exist. When the reference cell is plural in number, the reference frequency spectrum may be an average frequency spectrum which is calculated based on frequency spectrums of multiple beat signals sensed from the plurality of reference cells. The FMCW radar may perform a constant false alarm rate (CFAR) algorithm based on the threshold value.

In accordance with another aspect of the present invention to solve the second object of the present invention, a frequency modulated continuous wave (FMCW) radar for detecting a target, the FMCW radar may include a processor, wherein the processor may be configured: to transmit a sensing signal for detection of the target, and to receive a response signal in response to the sensing signal; to perform a signal processing on the response signal, and to generate a frequency spectrum of a beat signal; to determine a detection frequency band for detection of the target within a valid frequency band of the frequency spectrum; to determine a threshold value for determining a target detection peak value for detection of the target among peak values of the frequency spectrum; and to detect the target based on the detection frequency band and the threshold value. The detection frequency band may correspond to a frequency band obtained by excluding a frequency band corresponding to frequencies after a frequency of a largest peak value among the target detection peak values, from the valid frequency band, with respect to the largest peak value. The threshold value may be determined based on a clutter signal included in the response signal, and the clutter signal may be the response signal generated by an object which is not the target. The threshold value may be determined based on a reference frequency spectrum of a beat signal sensed in a reference cell, and the reference cell may be a detection area in which a target does not exist. When the reference cell is plural in number, the reference frequency spectrum may be an average frequency spectrum which is calculated based on frequency spectrums of multiple beat signals sensed from the plurality of reference cells. The FMCW radar may perform a constant false alarm rate (CFAR) algorithm based on the threshold value.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
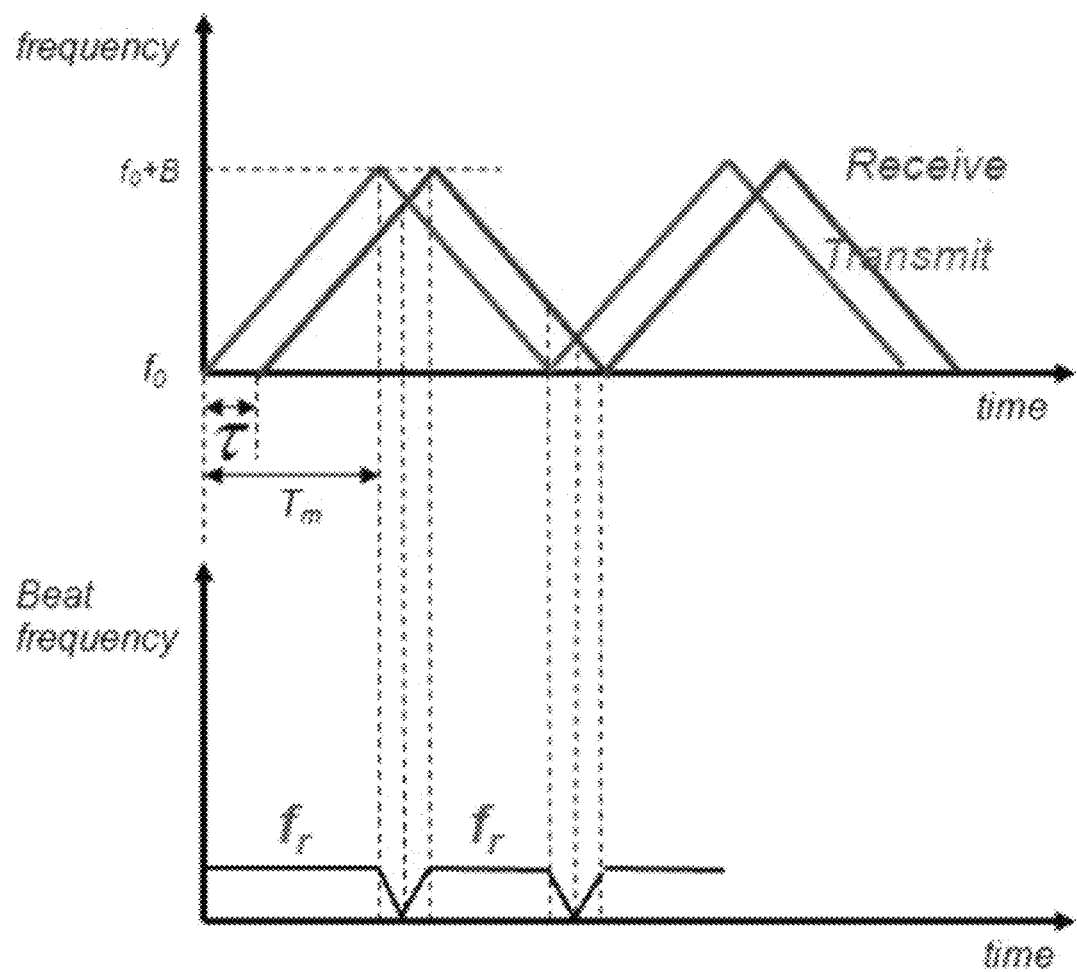
FIG. 1 is a graph representing a method for sensing an object using an FMCW radar.

As the present invention may make various changes and have various forms, it is intended to illustrate specific embodiments in the drawings and describe them in detail. However, it should be understood that this is intended not to limit the present invention to specific disclosed forms but to include all changes, equivalents and replacements that fall within the spirit and technical scope of the present invention. Like reference signs are used for like components in describing each drawing.

Although the terms like a first and a second are used to describe various components, the components should not be limited by the terms. The terms may be used for the purpose of distinguishing one component from another. For example, a first component may be named a second component and similarly, a second component may be named a first component without departing from the scope of right of the present invention. The term and/or includes a combination of a plurality of related described items or any of the plurality of related described items.

When being mentioned that a certain component is "connected" or "coupled" to another component, the former may directly be connected or coupled to the latter but the third component may exist between them. On the other hand, when being mentioned that a certain component is "directly connected" or "directly coupled" to another component, it should be understood that the third component does not exist between them.

The terms used herein are just for describing specific embodiments and are not intended to limit the present invention. The terms of a singular form may include plural forms unless clearly otherwise referred to in context. In this application, it should be understood that the term "include," "comprise," "have", "including", "comprising", or "having" is intended to specify that there are features, figures, steps, operations, components, parts or their combinations represented in the specification and not to exclude that there may be one or more other features, figures, steps, operations, components, parts, or their combinations or that they may be added.

Hereinafter, embodiments of the present invention will be described in more detail below with reference to the accompanying drawings. Hereinafter, the same reference numerals are used to designate the same component, and description thereof will not be repeated.

An embodiment of the present invention pertains to a method for sensing a surrounding environment on the basis of a frequency modulated continuous wave (FMCW) radar during vehicle travel. By using a surrounding environment sensing method according to an embodiment of the present invention, it is possible to more accurately sense a surrounding environment.

FIG. 1 is a graph representing a method for sensing an object using an FMCW radar.

The FMCW radar can transmit a frequency-modulated continuous signal to a target, and measure the distance to the target and the velocity of the target.

A conventional continuous wave (CW) radar can measure the velocity of a moving object, but cannot measure the distance to the moving object due to a relatively narrow bandwidth. In contrast, the FMCW radar expands the bandwidth of a wave to be transmitted by modulating the amplitude, frequency or phase thereof, and thus enables a distance measurement and a velocity measurement.

Referring to FIG. 1, a frequency waveform as a function of time when it is assumed that an object distanced by distance "R" from a radar has stopped is shown. First, when a linearly frequency-modulated signal, such as a first waveform, is transmitted, the signal is reflected by the object distanced by distance "R" and then is received by the radar after a time delay $$\frac{2R}{c}.$$

Here, "R" represents a distance to the target, and "c" represents the velocity ($3 \times 10^8$ m/s) of light. In this case, when the transmitted signal and the received signal are mixed with each other, a difference frequency between the signals can be obtained, as shown in Equation 1 below:

$$f_r = \frac{2R}{c} \cdot \frac{B}{T_m} \qquad (1)$$

R: distance to target
B: sweep bandwidth
c: velocity of light
$T_m$: sweep time
$F_r$: frequency shift due to delay When the difference frequency information calculated in Equation 1 is substituted into Equation 2 below, the distance "R" can be determined.

$$R = \frac{f_r \cdot c \cdot T_m}{2 \cdot B} \qquad (2)$$

Figure 2:
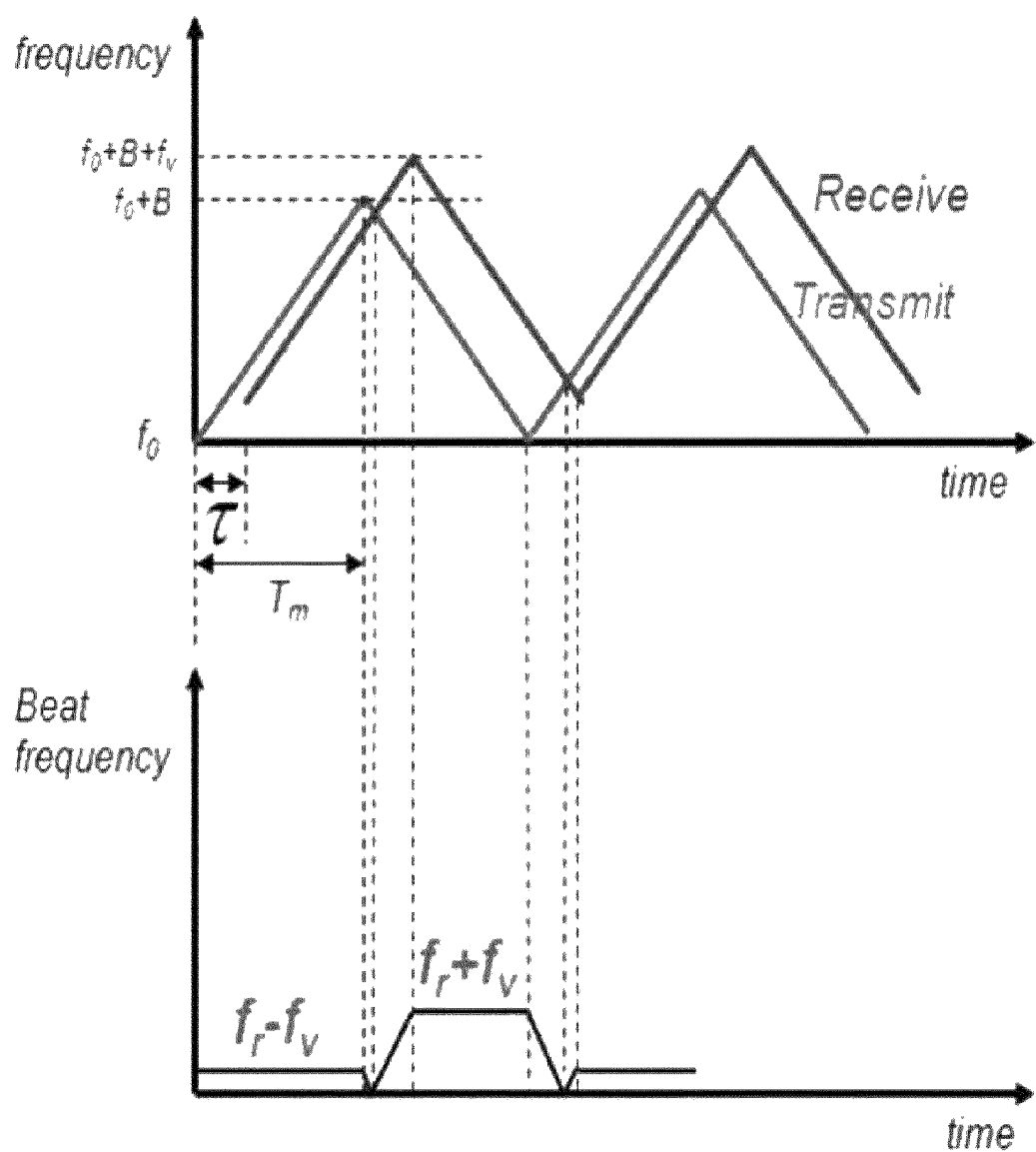
FIG. 2 is a graph representing a method for sensing an object using an FMCW radar.

FIG. 2 is a graph representing a method for sensing an object using an FMCW radar.

It is assumed that an object distanced by distance "R" from the radar is moving at a relative velocity $V_r$.

The FMCW radar may transmit a frequency-modulated continuous signal to measure the velocity of a target and the distance to the target.

In this case, a frequency shift such as Equation 3 below is generated due to the time delay of $$\frac{2R}{c}$$

and the Doppler effect.

$$f_v = \frac{2v_r}{\lambda} \qquad (3)$$

$$\lambda = \frac{c}{f_c}$$

$f_c$: carrier frequency

When the transmitted signal and a received signal are mixed with each other, the sum of and the difference between a frequency change $f_r$ due to time-delay according to distance and a frequency change $f_v$ (Doppler frequency) due to the Doppler effect can be obtained as shown in a lower portion in FIG. 2. When simultaneous equations are solved with the sum and the difference, information on a distance and a velocity can be obtained as shown in Equation 4 below.

$$R = \frac{f_r \cdot c \cdot T_m}{2 \cdot B} \qquad (4)$$

$$V_r = \frac{f_v \cdot \lambda}{2}$$

A beat frequency and a Doppler frequency can be obtained by a signal processing.

The beat frequency may represent the difference between a transmitted signal and a received signal. On an up-chirp, the beat frequency may be expressed as $f_{bu}$, while on a down-chirp, the beat frequency may be expressed as $f_{bd}$.

By an $N_s$-point discrete Fourier transform (DFT) in each chirp period, a frequency spectrum of a beat signal sampled by a frequency $f_s$ can be obtained. On the basis of the frequency spectrum of a beat signal determined by an FMCW radar, it is possible to sense a surrounding environment and to detect an object existing in a surrounding area. In the FMCW radar, while a signal reception unit of the FMCW radar is receiving a signal obtained from a sensing signal reflected by a target, a signal transmission unit of the FMCW radar can continuously transmit a sensing signal. The FMCW radar can generate a beat signal by mixing the waveforms of the received signal and the transmitted sensing signal with each other. When two or more targets exist, beat signals having two or more mutually different frequency bands may be generated as the output of a mixer.

Figure 3:
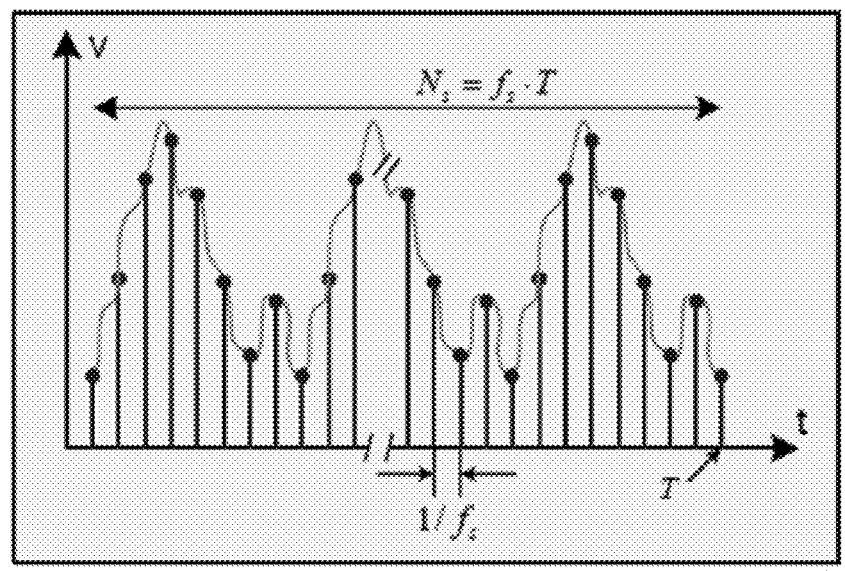
FIG. 3 is a graph representing sampling of a beat signal on the basis of DFT.
Figure 3:
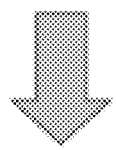
Figure 3:
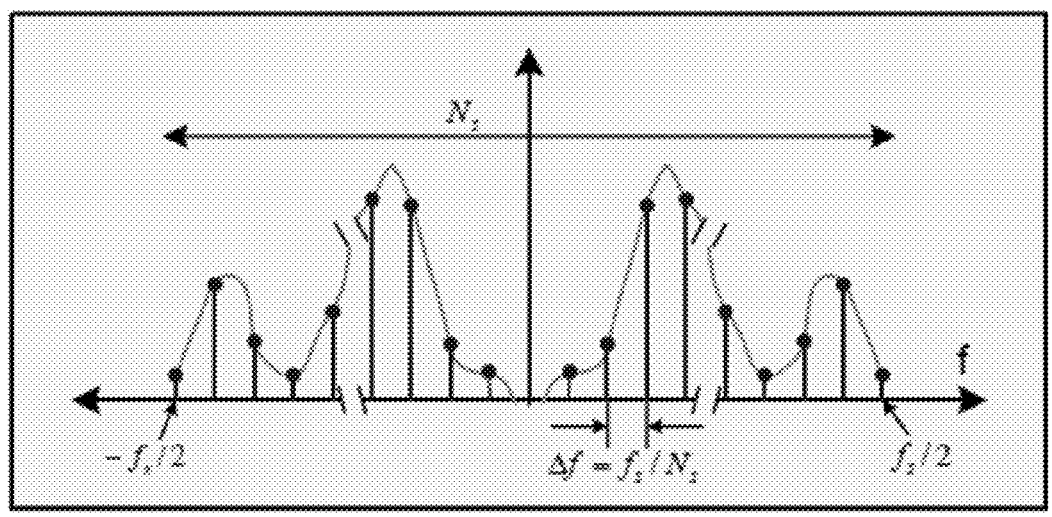

FIG. 3 is a graph representing sampling of a beat signal on the basis of DFT.

Referring to FIG. 3, the spectrum of a beat signal sampled by a frequency $f_s$ by performing an $N_s$-point DFT in each chirp period is shown.

"Δf" represents a frequency step, and "$N_s$" represents the number of data samples in a chirp period "T".

The FMCW radar performs a pairing on frequency peak information extracted from each of up-chirp and down-chirp, and thus generates information on a target.

When the relative velocity of a forward vehicle has a positive value (e.g. when the forward vehicle becomes farther and farther from his/her own vehicle), the frequencies detected in an up-chirp and a down-chirp, which are a frequency increase section and a frequency decrease section, respectively, are $f_{bu}=f_r-f_d$ and $f_{bd}=f_r+f_d$. That is to say, since values shifted to be symmetrized by $\pm f_d$ on the basis of $f_r$ are $f_{bu}$ and $f_{bd}$, when a combination thereof is found, a distance and a velocity can be calculated. Such a method is called a pairing algorithm.

On performing the pairing algorithm, when two targets exist, more targets than the two targets may be detected, and such an additionally detected target is called a ghost target. When such a ghost target exists, it is difficult for the FMCW radar to accurately sense an object.

On performing a pairing algorithm, as the number of targets increases, the number of ghost targets increases. Various methods are used not to generate ghost targets. However, as the number of frequency peaks extracted in an up-chirp/down-chirp increases, the probability of generation of ghost targets increases. When a structure, such as a tunnel or a guide rail, is stretched on a road, a more difficult environment may be made in sensing by the radar, and in this case, the generation of ghost targets may reduce the sensing and control stability of the radar.

The FMCW radar-based sensing method according to an embodiment of the present invention reduces the probability of generation of ghost targets, and thus can increase a FMCW radar-based sensing probability. That is to say, when the present invention is applied to an environment in which a structure, such as a tunnel or a guide rail, exists on a road, the probability of generation of ghost targets is reduced, so that a phenomenon, such as sudden break during high-speed traveling, can be prevented.

FIGS. 4(a)-4(d) are conceptual views representing a method for analyzing a frequency spectrum generated on the basis of a beat signal according to an embodiment of the present invention.

Figure 4A:
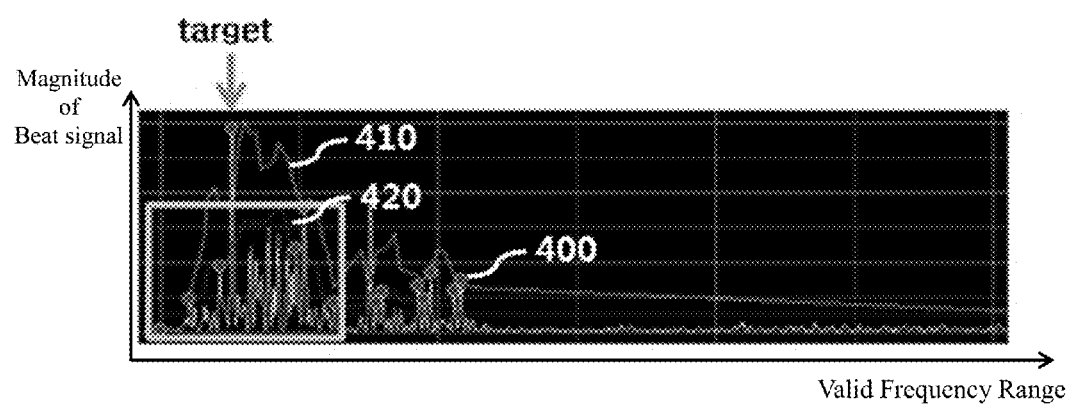
FIGS. 4(a)-4(d) are conceptual views representing a method for analyzing a frequency spectrum generated on the basis of a beat signal according to an embodiment of the present invention.
Figure 4B:
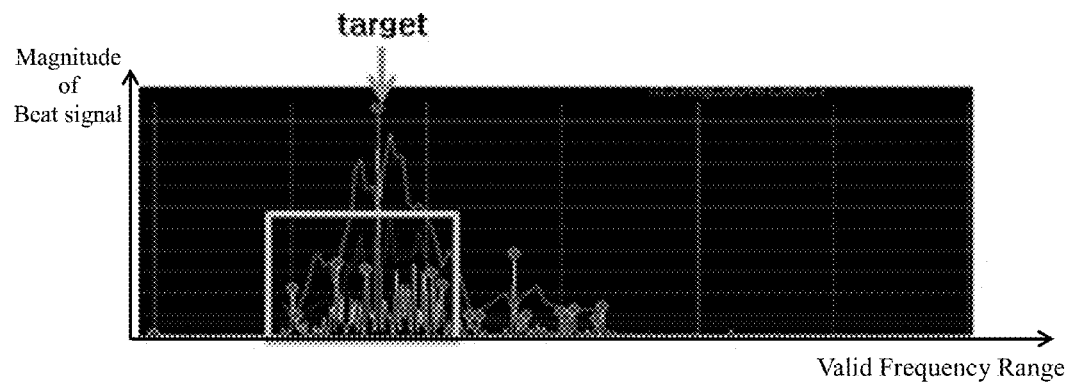

Referring to FIGS. 4(a) and 4(b), the frequency spectrums of a beat signal which is obtained by mixing an FMCW signal and a signal received by transmitting the FMCW signal are shown. When a guide rail or a tunnel exists in an area sensed by the FMCW radar, a clutter level increases as shown in a quadrangular areas 430 of FIGS. 4(a)-4(d). The clutter represents that an object generating an unwanted radar reception signal appears.

In the graphs of FIGS. 4(a)-4(d), each x axis represents a valid frequency range, and each y axis represents the magnitude of a beat signal, wherein frequency peaks extracted within the entire valid frequency range are expressed with circles (400). As shown in FIGS. 4(a)-4(d), many peaks are extracted within a clutter range. In this case, if a conventional pairing as described above is used to calculate the velocity of a target and the distance to the target, the probability of generation of ghost targets increases.

In contrast, according to an embodiment of the present invention, when it is determined that fixed objects, such as a guide rail, a tunnel or the like, exist on a road, it is possible to reduce the probability of generation of ghost targets through a method of limiting the valid frequency range of a reception signal.

According to an embodiment of the present invention, the limitation of valid frequencies for detection of targets may be made on the basis of a large-magnitude peak made by a target, as indicated by arrows. A range of relatively higher frequencies on the basis of a large-magnitude peak corresponds to a long-distance area, and thus has a relatively low importance in sensing. Therefore, a beat signal may be analyzed in a method in which a high-frequency range in a result of the performance of a fast Fourier transform (FFT) is excluded in the following signal processing.

Figure 4C:
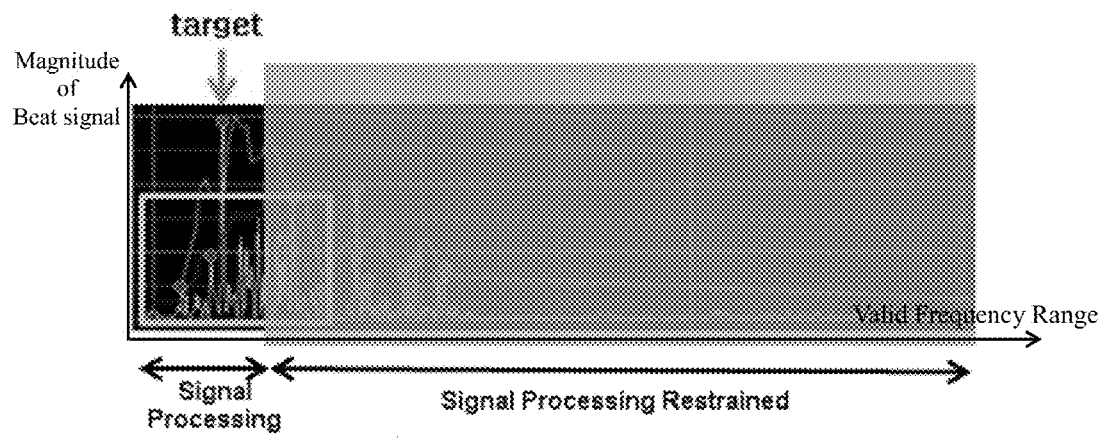
Figure 4D:
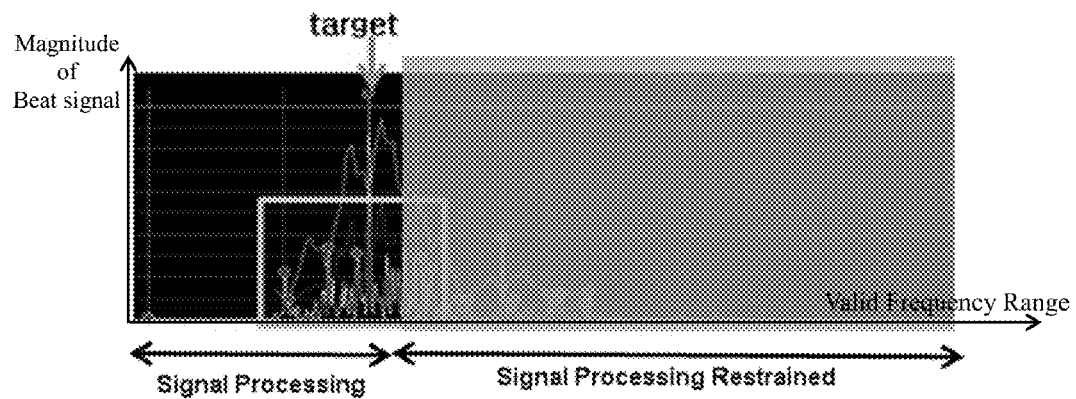

In FIGS. 4(c) and 4(d), the graphs represent the frequency spectrums of beat signals in which valid frequencies are limited.

When the method of limiting a frequency spectrum for sensing a target in the frequency spectrum of a beat signal is used, the probability of generation of ghost targets and the probability of drop of a target are lower than those in the conventional method. That is to say, when targets are detected with valid frequencies limited in the frequency spectrum of a beat signal, as described according to the present invention, the generation of ghost targets is restrained and the probability of drop of actual targets is reduced, so that a stable sensing performance can be ensured.

In addition, according to an embodiment of the present invention, a threshold value for extracting a peak may be set to analyze the frequency spectrum of a beat signal on the basis of the set threshold value. The threshold value has a magnitude analyzed as valid signals of the output of the receiver.

Referring to FIGS. 4(a)-4(d), first line 410 and second line 420 existing above a frequency spectrum may be lines set as a threshold value for extracting peaks for the detection of targets. If the frequency range of a structure is sensed through such an environment recognition, the sensing performance can be improved through a factor adjustment for threshold value setup, or the like when an algorithm such as a constant false alarm rate (CFAR) for peak extraction is performed.

Figure 5:
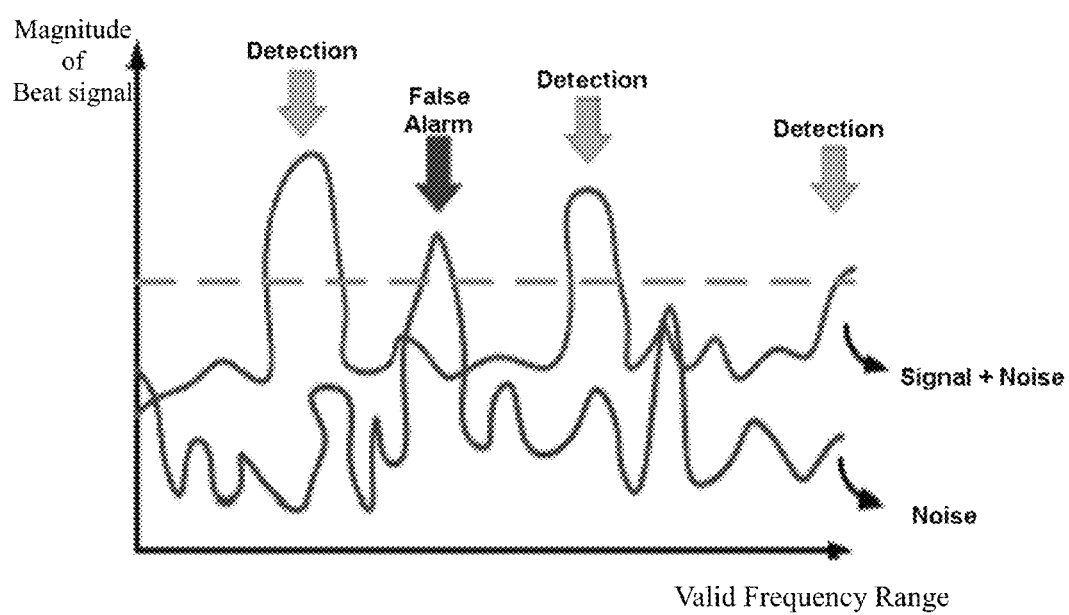
FIG. 5 illustrates a method of performing a CFAR algorithm in a radar.

FIG. 5 illustrates a method of performing a CFAR algorithm in a radar.

A detection probability and a false alarm probability may be considered as the scales of radar detection determination.

Referring to FIG. 5, the detection probability means a probability that a signal sample mixed with noise exceeds a threshold value for detection determination. The false alarm probability means a probability that a false alarm by a sample exceeding the threshold value for detection determination is generated in an environment in which only noise exists. The two scales may be determined by the SNR of a given signal in a block in which detection determination is made.

According to an embodiment of the present invention, it is possible to increase the probability of detection by an FMCW radar by setting a threshold value for identifying a detection probability and a false alarm probability on the basis of a received signal.

For example, the threshold value may be obtained by updating a clutter map. A signal reflected by an object which is not a target and returned to the FMCW radar, as described above, may be called a clutter signal. While moving in an area in which a constant object is continuously located, the FMCW radar may receive the same clutter signal. On the basis of such a clutter signal, a threshold value for determining whether or not a target exists may be set. For example, a clutter signal obtained in a state in which there is no target is stored in a database, and it may be determined that a target has been detected by the FMCW radar when a newly received signal is compared with the stored signal and there is a difference between the two signals. Clutter information received in the same magnitude while a predetermined period of time is passing, as described above, is stored in a database, which is called a clutter map. The clutter map may be updated to include a new signal when it is finally determined that there is no target through a CAFR, and may be not updated when it is finally determined that a target exists. A threshold value for determining a CAFR may be set with reference to information of such a clutter map. That is to say, it is set that a signal processing for sensing a target is not to be performed on a continuously detected clutter, and thus the sensing operation can be performed in distinction between targets and clutters.

According to a still another threshold value setting method, a reference cell may be set to determine a threshold value on the basis of the beat signal spectrum of the reference cell. A remaining cell, except for cells around a cell of interest in which it is desired to determine whether or not a target exists, may be set as a reference cell; and a threshold value may be set on the basis of the frequency spectrum of a beat signal sensed from the reference cell. For example, the average of the frequency spectrums of beat signals sensed from a plurality of reference cells may be calculated to set a threshold value. A peak value corresponding to a set threshold value or less may be determined not to be a signal obtained by sensing a target, and may be not subjected to a signal processing for detecting a target.

Figure 6:
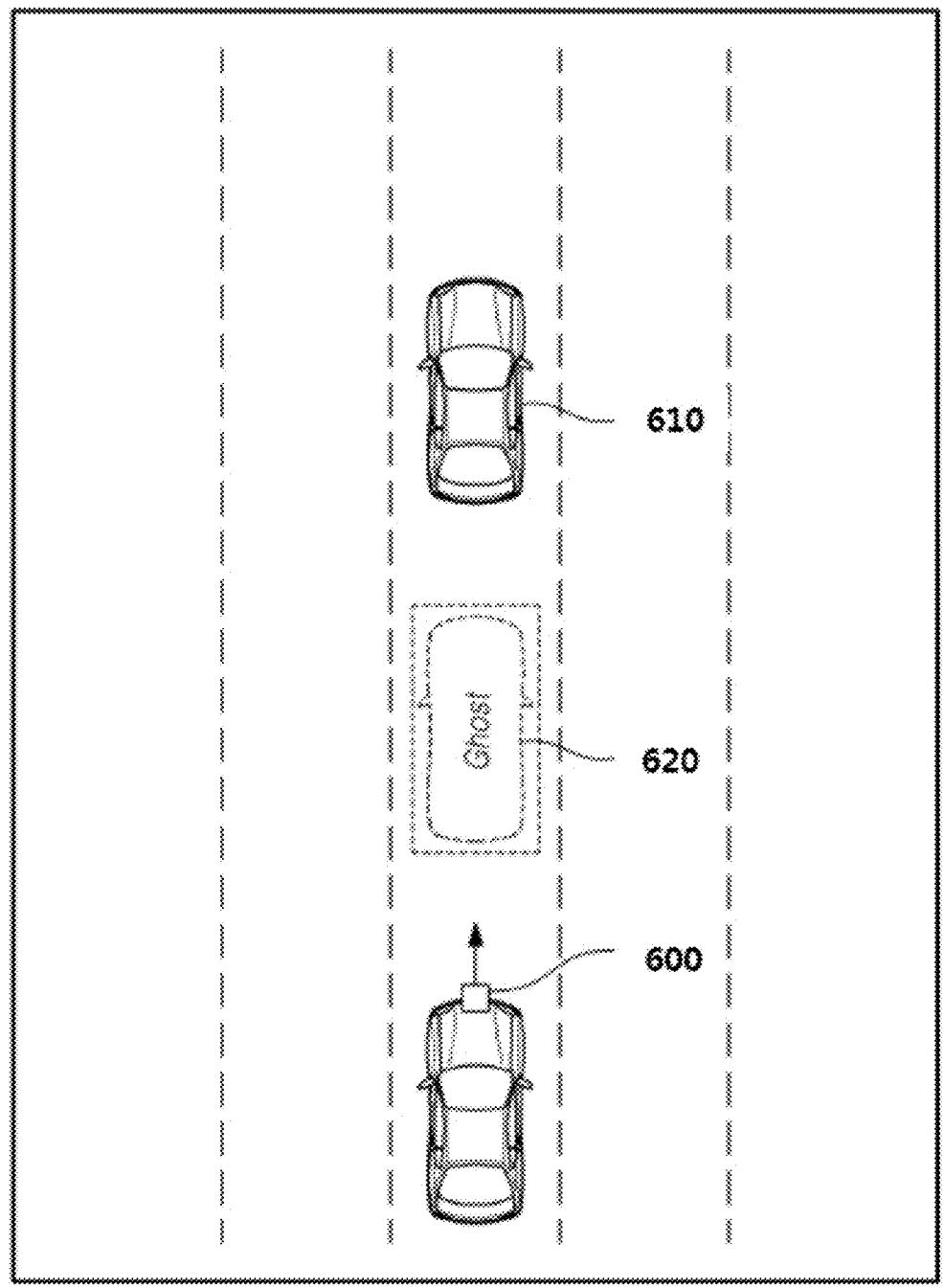
FIG. 6 is a view illustrating a case in which an FMCW radar device detects a target object according to an embodiment of the present invention.

FIG. 6 is a view illustrating a case in which an FMCW radar device detects a target object according to an embodiment of the present invention.

Referring to FIG. 6, an FMCW radar device 600 according to an embodiment of the present invention may transmit a sensing signal and receive a reflected signal returned after the sensing signal is reflected by an object 610. The FMCW radar device 600 senses objects existing in a surrounding area using the reflected signal.

If a reflected signal includes only a signal reflected by a target 610 which is an actual object, the target which is an actual object can be accurately sensed. However, transmission signals transmitted from another radar device, anther communication device, or the like existing in the vicinity thereof may exists as interference signals, or a clutter, such as a guide rail or a tunnel, may generate an interference signal. When interference signals due to other factors exist, and the interference signals are received as reflected signals, together with a signal reflected by the target object 610 which is an actual object, a ghost object 620, not the actual object, may be sensed due to the interference signals.

The radar device 600 according to an embodiment of the present invention uses a method for can actually sensing the target object 610 which is an actual object, limiting the valid frequency band of a beat signal determined on the basis of a received signal so as not to sense the ghost object 620 which is not the actual object 610, and also limiting a threshold value for extracting a peak.

For example, for setting a valid frequency band, a frequency band higher than a frequency band corresponding to the highest peak on the basis of the highest peak within the frequency spectrum of a beat signal may be determined as an invalid frequency band.

In addition, as described above, a threshold value for extracting a peak for the detection of an object may be newly determined, and only peaks corresponding to a magnitude equal to or greater than the corresponding threshold value may be determined to be valid values and be sensed.

Figure 7:
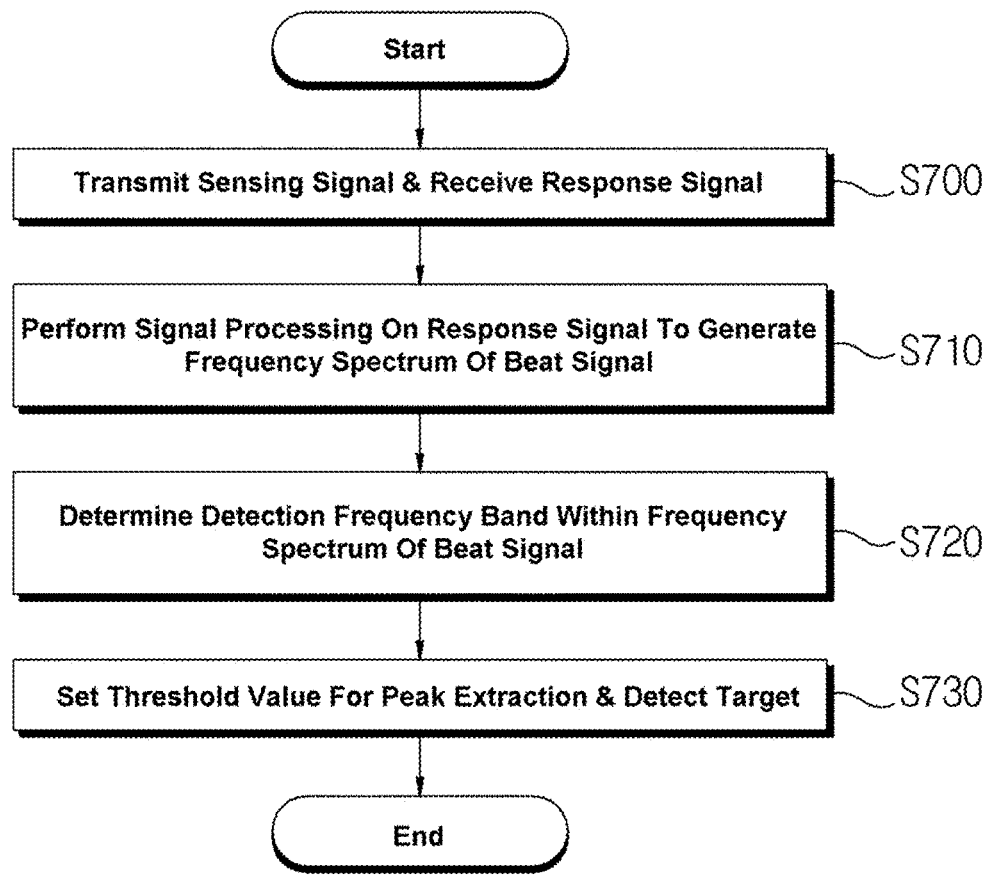
FIG. 7 is a conceptual view illustrating a method by which an FMCW radar device senses a target object according to an embodiment of the present invention.

FIG. 7 is a conceptual view illustrating a method by which an FMCW radar device senses a target object according to an embodiment of the present invention.

Referring to FIG. 7, an FMCW radar may transmit a sensing signal and receive a response signal in step S700.

The FMCW radar may transmit a frequency-modulated continuous sensing signal to measure the distance to a target and the velocity of the target. The transmitted continuous sensing signal may be reflected by an object which exists within a sensing region, and the FMCW radar may receive a response signal (or a reflected signal) in response to the sensing signal.

A signal processing is performed on the response signal, so that the frequency spectrum of a beat signal is generated in step S710.

The FMCW radar may generate the frequency spectrum of a beat signal by mixing the transmitted sensing signal and the received response signal, and performing a signal processing, such as an FFT, on the mixed signal. The FMCW radar generates target information by pairing frequency peak information extracted in each of up-chirp and down-chirp.

A detection frequency band to be detected in the frequency spectrum of a beat signal is determined in step S720.

According to an embodiment of the present invention, the entire frequency spectrum of a beat signal is not analyzed, but a partial frequency band of a valid frequency range is set as a detection frequency band to be used as a band for target sensing. For example, a band set as a detection frequency band may be determined with respect to a large-magnitude peak caused by a target. A high frequency range with respect to the largest-magnitude peak is determined to be a long-distance area, and a sensing operation is not performed on the long-distance area, so that a beat signal can be analyzed in a method of limiting objects on which a signal processing is to be performed.

When such a frequency range limitation method is used, the generation of a ghost target is restrained, and the probability of dropping an actual target is reduced, so that a stable sensing performance can be ensured.

A threshold value for extracting a peak is set, and the frequency spectrum of a beat signal is analyzed in step S730.

A threshold value for extracting a peak may be set to analyze the frequency spectrum of a beat signal on the basis of the set threshold value. The threshold value may correspond to a magnitude which is analyzed as a valid signal of the output of the receiver. Only a beat signal having a magnitude equal to or greater than the threshold value may be determined as a valid sensing value, and an analysis for the frequency spectrum of the determined beat signal may be performed. When an algorithm such as a constant false alarm rate (CFAR) for peak extraction is performed, the sensing performance can be improved through a factor adjustment for setup of a threshold value or the like. The threshold value may be set in various manners. For example, the threshold value may be set in such a manner as to use the frequency spectrum of a beat signal detected and received from a reference cell, or in such a manner as to determine a peak generated by a clutter, not by a target, on the basis of a clutter map and not to detect a corresponding peak value as a target.

Figure 8:
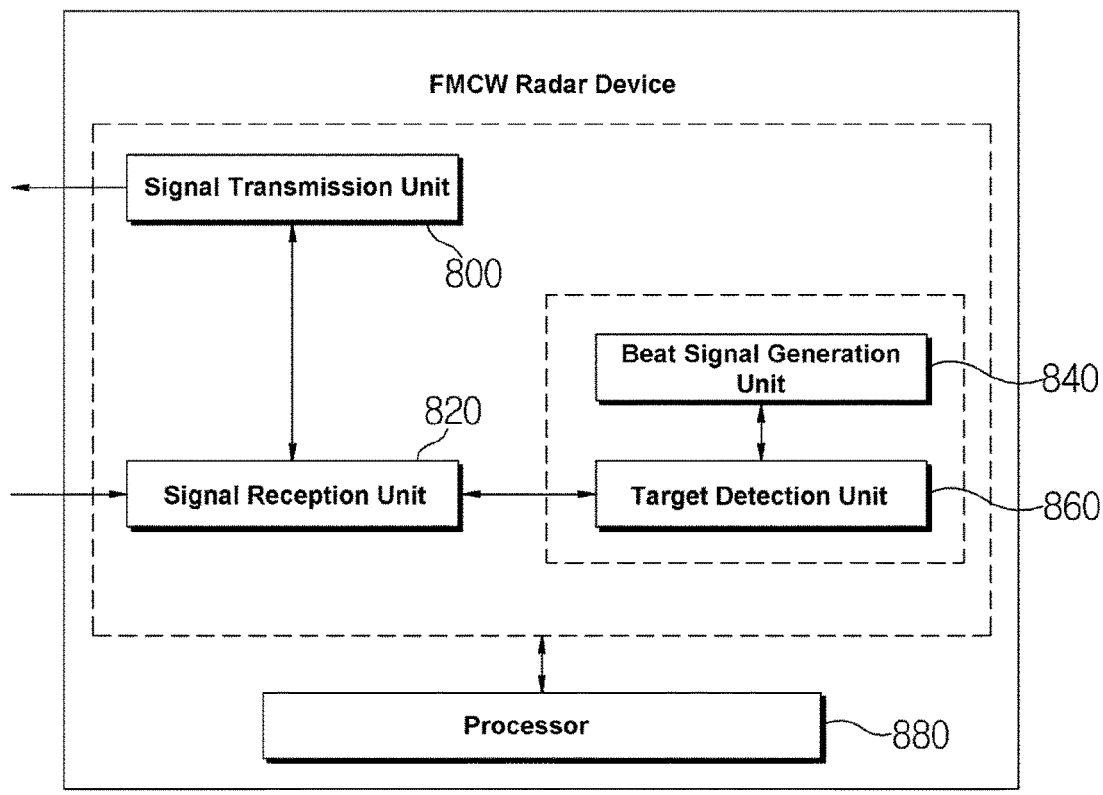
FIG. 8 is a conceptual view illustrating an FMCW radar device according to an embodiment of the present invention.

FIG. 8 is a conceptual view illustrating an FMCW radar device according to an embodiment of the present invention.

Referring to FIG. 8, the FMCW radar device according to an embodiment of the present invention may include a signal transmission unit 800, a signal reception unit 820, a beat signal generation unit 840, a target detection unit 860, and a processor 880. The respective components of the FMCW radar device may be implemented to perform the operation of the FMCW radar, described with reference to FIGS. 1 to 7. For convenience of description, the respective components are distinguished according to functions, wherein one component may be implemented with a plurality of components, and a plurality of components may be implemented with one component.

The signal transmission unit 800 may be implemented to transmit a sensing signal of an FMCW radar. The signal transmission unit 800 may be implemented to control the interval between the transmission start time points of transmission signals, and to transmit a transmission signal every determined transmission start time point according to the controlled interval between the transmission start time points. For example, the signal transmission unit 800 may include a phase locked loop (PLL), a voltage controlled oscillator (VCO), an amplifier, and the like. The PLL may be implemented to constantly maintain the frequency of a provided transmission signal, and the VCO may transfer a transmission signal provided from the PLL to the amplifier after modulating the frequency of the transmission signal. The amplifier may amplify the frequency-modulated signal to have a predetermined magnitude.

The signal reception unit 820 may receive a reflected signal obtained when the transmission signal transmitted from the signal transmission unit 800 is reflected at surroundings.

The beat signal generation unit 840 may mix the signal transmitted by the signal transmission unit 800 and the signal received by the signal reception unit 820, thereby generating a beat signal. The beat signal generation unit 840 may generate the frequency spectrum of a beat signal sampled with a specific frequency by performing a discrete Fourier transform (DFT) at each chirp period.

The target detection unit 860 may detect a target on the basis of the frequency spectrum of a beat signal generated by the beat signal generation unit 840. According to an embodiment of the present invention, the target detection unit 860 may determine a detection frequency band, in the frequency spectrum of a beat signal, to be used to detect a target. According to an embodiment of the present invention, the entire frequency spectrum of a beat signal is not analyzed, but a partial frequency band of a valid frequency range is set as a detection frequency band to be used as a band for target sensing. A band set as a detection frequency band in the target detection unit 860 may be determined with respect to a large-magnitude peak caused by a target. A high frequency range with respect to the largest-magnitude peak is determined to be a long-distance area, and a sensing operation is not performed on the long-distance area, so that a beat signal can be analyzed in a method of limiting objects on which a signal processing is to be performed.

In addition, target detection unit 860 may set a threshold value for extraction of a peak, and analyze the frequency spectrum of a beat signal. The target detection unit 860 may set a threshold value for extraction of a peak, and analyze the frequency spectrum of a beat signal with respect to the set threshold value. The threshold value may correspond to a magnitude which is analyzed as a valid signal of the output of the receiver. Only a beat signal having a magnitude equal to or greater than the threshold value may be determined as a valid sensing value, and an analysis for the frequency spectrum of the determined beat signal may be performed.

The processor 880 may be implemented to control the operations of the signal transmission unit 800, the signal reception unit 820, the beat signal generation unit 840, and the target detection unit 860.

As described above, the method and device for sensing a surrounding environment on the basis of an FMCW radar according to an embodiment of the present invention is used, the probability of generation of ghost targets is reduced, so that the probability of actually sensing a target on the basis of an FMCW radar can increase. That is to say, when the present invention is applied in an environment in which a structure, such as a guide rail, a tunnel, or the like, exists on a road, the probability of generation of ghost targets is reduced, so that a phenomenon, such as sudden break during high-speed traveling, can be prevented.

While the present invention has been described with respect to the specific embodiments, it will be apparent to those skilled in the art that various changes and modifications may be made without departing from the spirit and scope of the invention as defined in the following claims.

What is claimed is:

1. A method for detecting a target based on a frequency modulated continuous wave (FMCW) radar including a processor, the method comprising:
    transmitting, by the processor, a sensing signal for detection of the target, and receiving, by the processor, a response signal in response to the sensing signal;
    performing, by the processor, a signal processing on the response signal, and generating, by the processor, a frequency spectrum of a beat signal;
    determining, by the processor, a detection frequency band for detection of the target within a valid frequency band of the frequency spectrum;
    determining, by the processor, a threshold value to determine a target detection peak value for detection of the target among peak values of the frequency spectrum; and
    detecting, by the processor, the target based on the detection frequency band and the threshold value,
    wherein the detection frequency band corresponds to a frequency band obtained by excluding a frequency band corresponding to frequencies which are greater than a frequency of a greatest peak value among the target detection peak values, from the valid frequency band.

2. The method according to claim 1, wherein the threshold value is determined based on a clutter signal included in the response signal, and
    the clutter signal is the response signal generated by an object which is not the target.

3. The method according to claim 1, wherein the threshold value is determined based on a reference frequency spectrum of a beat signal sensed in a reference cell, and
    the reference cell is a detection area in which a target does not exist.

4. The method according to claim 3, wherein, when the reference cell is plural in number, the reference frequency spectrum is an average frequency spectrum which is calculated based on frequency spectrums of multiple beat signals sensed from the plurality of reference cells.

5. The method according to claim 1, further comprising:
    performing a constant false alarm rate (CFAR) algorithm based on the threshold value.

6. A frequency modulated continuous wave (FMCW) radar for detecting a target, the FMCW radar comprising a processor, wherein
    the processor is configured:
        to transmit a sensing signal for detection of the target, and to receive a response signal in response to the sensing signal;
        to perform a signal processing on the response signal, and to generate a frequency spectrum of a beat signal;
        to determine a detection frequency band for detection of the target within a valid frequency band of the frequency spectrum;
        to determine a threshold value for determining a target detection peak value for detection of the target among peak values of the frequency spectrum; and
        to detect the target based on the detection frequency band and the threshold value,
    wherein the detection frequency band corresponds to a frequency band obtained by excluding a frequency band corresponding to frequencies which are greater than a frequency of a greatest peak value among the target detection peak values, from the valid frequency band.

7. The FMCW radar according to claim 6, wherein the threshold value is determined based on a clutter signal included in the response signal, and
    the clutter signal is the response signal generated by an object which is not the target.

8. The FMCW radar according to claim 6, wherein the threshold value is determined based on a reference frequency spectrum of a beat signal sensed in a reference cell, and
    the reference cell is a detection area in which a target does not exist.

9. The FMCW radar according to claim 8, wherein, when the reference cell is plural in number, the reference frequency spectrum is an average frequency spectrum which is calculated based on frequency spectrums of multiple beat signals sensed from the plurality of reference cells.

10. The FMCW radar according to claim 6, wherein the processor is further configured to perform a constant false alarm rate (CFAR) algorithm based on the threshold value.

* * * * *